United States Patent
Wang et al.

(10) Patent No.: US 8,273,501 B2
(45) Date of Patent: Sep. 25, 2012

(54) SYSTEM AND METHOD FOR HYDRATING A PROTON EXCHANGE MEMBRANE FUEL CELL

(75) Inventors: Tie Wang, Rochester Hills, MI (US); James A. Adams, Ann Arbor, MI (US); George S. Saloka, Dearborn, MI (US); Chendong Huang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 453 days.

(21) Appl. No.: 12/512,675

(22) Filed: Jul. 30, 2009

(65) Prior Publication Data

US 2011/0027669 A1    Feb. 3, 2011

(51) Int. Cl.
*H01M 8/04* (2006.01)
(52) U.S. Cl. ........................................................ 429/513
(58) Field of Classification Search .................. None
See application file for complete search history.

(56) References Cited

U.S. PATENT DOCUMENTS

| | | | |
|---|---|---|---|
| 4,769,297 A | 9/1988 | Reiser et al. | |
| 5,200,278 A | 4/1993 | Watkins et al. | |
| 6,106,964 A | 8/2000 | Voss et al. | |
| 6,467,698 B2 | 10/2002 | Gaarder et al. | |
| 6,541,141 B1 | 4/2003 | Frank et al. | |
| 6,579,637 B1 | 6/2003 | Savage et al. | |
| 6,696,192 B2 | 2/2004 | Kanai et al. | |
| 6,723,461 B2 | 4/2004 | Gorman et al. | |
| 6,916,571 B2 | 7/2005 | Grasso et al. | |
| 7,250,075 B1 | 7/2007 | Vasquez et al. | |
| 2005/0031914 A1 | 2/2005 | Breault | |
| 2007/0087239 A1 | 4/2007 | Mulvenna et al. | |
| 2008/0182148 A1* | 7/2008 | Skala | 429/34 |

* cited by examiner

*Primary Examiner* — Patrick Ryan
*Assistant Examiner* — Wyatt McConnell
(74) *Attorney, Agent, or Firm* — Brooks Kushman P.C.; Damian Porcari (57) ABSTRACT

A fuel cell hydration system comprising a first reservoir is provided. The first reservoir is positioned between a cathode supply and a fuel cell stack. The first reservoir includes corrugated regions positioned axially along the first reservoir to accumulate water discharged from a first fluid stream. The first fluid stream absorbs the accumulated water when an amount of water within the first fluid stream is below a water level to hydrate the fuel cell stack.

21 Claims, 4 Drawing Sheets

SYSTEM AND METHOD FOR HYDRATING A PROTON EXCHANGE MEMBRANE FUEL CELL

BACKGROUND

1. Technical Field

One or more embodiments of the present invention generally relate to a system and method for hydrating a proton exchange membrane fuel cell (PEMFC).

2. Background Art

It is known that a number of fuel cells are joined together to form a fuel cell stack. Such a stack generally provides electrical current in response to electrochemically converting hydrogen and oxygen into water. The electrical current generated in such a process is used to drive various devices in a vehicle or other such apparatus.

Each fuel cell within the stack generally includes first and second flow plates, an anode, a cathode, and the PEM (or membrane). The anode and cathode each include a catalyst. The first and the second flow plates define flow fields for facilitating hydrogen and oxygen flow (e.g., or air) through the anode and the cathode, respectively. The anode, the catalyst, the membrane, and the cathode are generally sandwiched between the first and the second flow plates. Hydrogen is channeled through the flow field of the first flow plate to the anode of the fuel cell. Oxygen is channeled through the flow field of the second flow plate to the cathode of the fuel cell. The anode catalyst causes the hydrogen at the anode to split into positive ions and electrons. The membrane allows the positive ions to pass through to the cathode while the electrons travel along an external circuit to the cathode. Such a travel of the electrons along the external circuit to the cathode generates electrical current. At the cathode, the positive ions and the electrons combine with the oxygen to form water that is discharged from the fuel cell.

In general, the hydration state of the membrane is a parameter that influences fuel cell performance. There should be an adequate amount of water in the membrane of each fuel cell to avoid degradation and to lower membrane resistance to meet performance needs.

The water in the membrane may come from two sources. A first source of water may come from the incoming humidified hydrogen and/or air that is passed through the anode and/or cathode, respectively. Optionally, water may come from humidified air that is passed through the cathode. A second source of water is generated by the oxygen reduction reaction on the cathode. To generate wet gases, a certain amount of parasitic power may be needed. Parasitic power is a part of the gross stack power that is needed to run a balance of plant components, such as pumps, humidifiers or other suitable devices. To minimize the parasitic power, drier gas may be preferred. In some cases, newly developed membranes may operate with a much drier gas (e.g., under 50% of relative humidity) at the inlet of the fuel cell stack. When the fuel cell stack operates at low loads (e.g., low current generating mode or when the vehicle is in an idle state), the cathode reaction is low and the amount of water generated may not be sufficient to hydrate the membrane.

SUMMARY

A fuel cell hydration system comprising a first reservoir is provided. The first reservoir is positioned between a cathode supply and a fuel cell stack. The first reservoir includes corrugated regions positioned axially along the first reservoir to accumulate water discharged from a first fluid stream. The first fluid stream absorbs the accumulated water when an amount of water within the first fluid stream is below a water level to hydrate the fuel cell stack.

DETAILED DESCRIPTION

Figure 1:
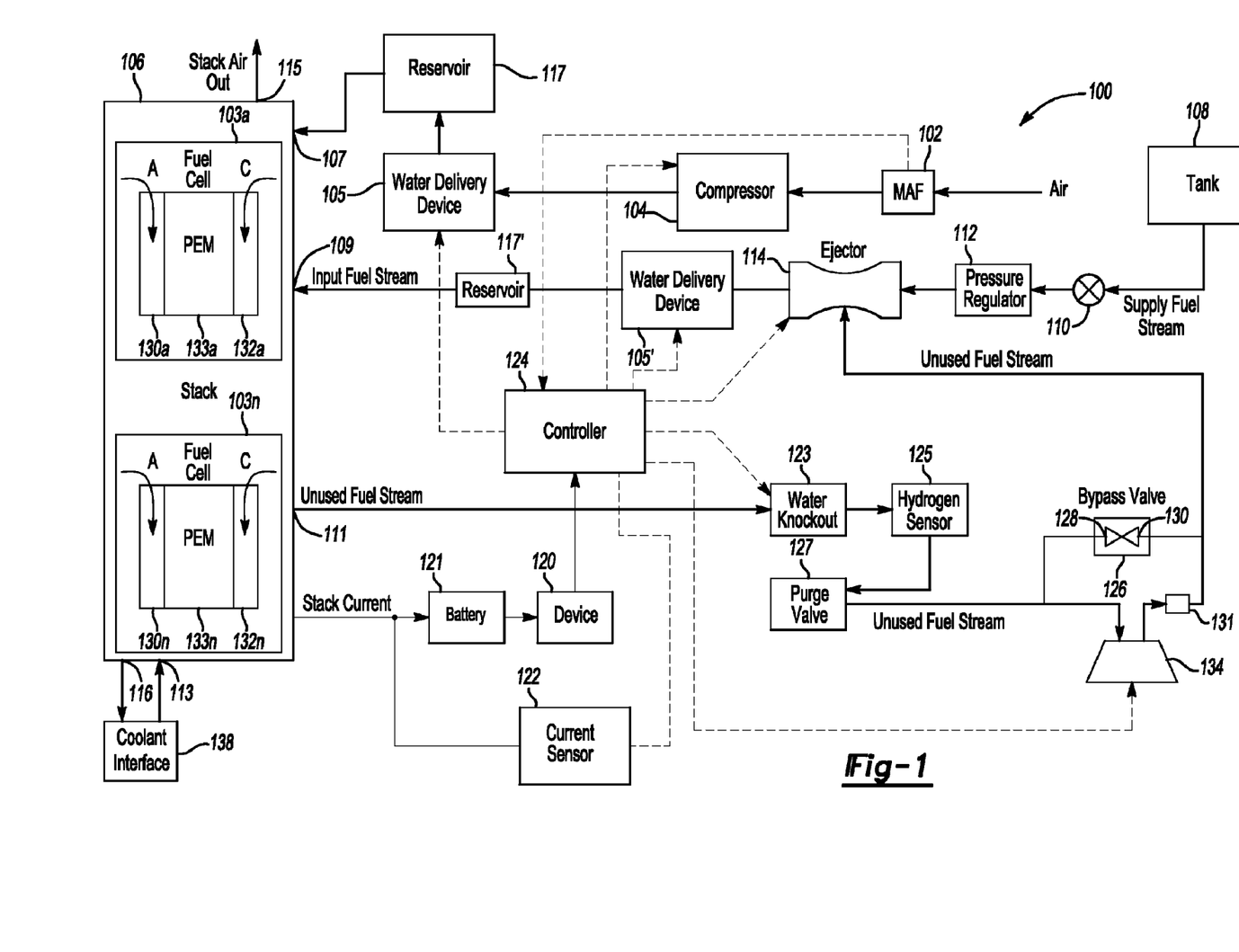
FIG. 1 depicts a fuel cell stack hydrating system in accordance to one embodiment of the present invention.

FIG. 1 illustrates an exemplary fuel cell stack recirculating system 100 in accordance with one embodiment of the present invention. The system 100 may be implemented in fuel cell based electric vehicle or fuel cell based hybrid vehicle or any other such apparatus that uses electrical current to drive various devices in response to a first fluid stream (e.g., air) and an input fuel stream (e.g., hydrogen). The system 100 generally includes a fuel cell stack 106. A plurality of fuel cells 103*a*-103*n* operably coupled to each other form the fuel cell stack 106. Each fuel cell 103*a*-103*n* generally includes a first flow plate (not shown), a second flow plate (not shown), an anode 130*a*-130*n*, a cathode 132*a*-132*n*, and a PEM (or membrane) 133*a*-133*n*, respectively. The anodes 130*a*-130*n* and the cathodes 132*a*-132*n* each include a catalyst (not shown).

The first fluid stream (or cathode stream) is fed to a mass air flow (MAF) sensor 102. The air passing through the MAF sensor 102 is atmospheric air. The MAF sensor 102 measures the amount of flow of air in the first fluid stream. An air compressor 104 (or blower) pressurizes the air stream and delivers the air stream to a first water delivery device 105. The first water delivery device 105 is generally configured to add water into the first fluid stream (or humidify the first fluid stream). The water may be needed to ensure that the membranes 133*a*-133*n* in the fuel cells 103*a*-103*n* remain humidified to provide for optimal operation of the fuel cell stack 106.

The first water delivery device 105 may be implemented as a humidifier or as a gas-to-gas device. In the event the first water delivery device 105 is implemented as a humidifier, the humidifier may be controlled as set forth in U.S. Ser. No. 11/764,249, entitled "FUEL CELL HUMIDITY CONTROL SYSTEM AND METHOD" as filed on Jun. 18, 2007, which is hereby incorporated by its entirety by reference. In the event the first water delivery device 105 is implemented as a gas-to-gas device, the gas-to-gas device uses a membrane that is selective to water to pass water vapor from a humidified fluid stream to a dry or less humidified fluid stream. Other such humidifiers, such as bubblers and sprayers may be implemented.

A first reservoir 117 is fluidly coupled to the first water delivery device 105. The first reservoir 117 passes the first fluid stream into an inlet 107 of the fuel cell stack 106. The first reservoir 117 is generally defined by a plurality of corrugated regions that are coupled to one another. The first reservoir 117 is generally configured to accumulate liquid water within the corrugated regions to ensure that the first fluid stream achieves an optimal humidity level (or optimal amounts of water) while minimizing the amount of liquid water present in the first fluid stream prior to the first fluid stream entering into the fuel cell stack 106 to ensure that the membranes 133a-133n are adequately hydrated.

It is generally known that a gas (e.g., air and/or hydrogen) is generally capable of storing a maximum amount of water for a given temperature and pressure. Depending on the particular temperature and pressure at any point in the system 100, the amount of water that is capable of being stored in the first fluid stream may vary. In the event there is a temperature drop between the first water delivery device 105 and the first reservoir 117, such a condition may cause the first fluid stream to discharge water into the first reservoir 117 due to condensation. In such an example, the first reservoir 117 may store or accumulate water in a liquid state in the corrugated regions for the first fluid stream to absorb in moments in which the first fluid stream is capable of absorbing more water content. For example, in the event there is water loss in the first fluid stream after being humidified by the water delivery device 105 (e.g., if there is a temperature increase between the first water delivery device 105 and the fuel cell stack 106), the first fluid stream may absorb water (either in liquid or vapor form) as the first fluid stream passes through the first reservoir 117. The first fluid stream absorbs any additional amount of water in the first reservoir 117 so that the corresponding amount of water present in the first fluid stream is achieved at the given temperature and pressure. As exhibited above, the first reservoir 117 may act as a self-regulating water storage and delivery device. In general, the reservoir 117 may be positioned as close as possible to the fuel cell 106 so long as the reservoir 117 is not capable of introducing liquid water into the fuel cell stack 106.

The first reservoir 117 is generally configured to prevent liquid water from entering into the fuel cell stack 106. Water in liquid form which enters into the fuel cell stack 106 may cause flooding thereby lowering fuel cell performance. The first reservoir 117 prevents water from entering into the fuel cell stack 106 since it is configured to collect water in liquid form from the stream in the event the stream includes too much water. It is generally contemplated that the first reservoir 117 may be orientated horizontally or vertically with respect to the fuel cell stack 106.

A tank (or supply) 108 presents a supply fuel stream (or an anode stream) in the form of hydrogen into the system 100. The supply fuel stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrids may be used instead of compressed gas.

A tank valve 110 controls the flow of the supply hydrogen. A pressure regulator 112 regulates the flow of the supply hydrogen. An ejector 114 (either a variable or multistage ejector or other such suitable ejector) is configured to combine the supply hydrogen (e.g., hydrogen received from the tank 108) with unused hydrogen (e.g., recirculated from the fuel cell stack 106) to generate an input fuel stream (or stack hydrogen). The pressure regulator 112 is generally adapted to provide the supply hydrogen to the ejector 114 at a constant pressure. A second water delivery device 105' is positioned between the ejector 114 and the fuel cell stack 106 to add water to the input fuel stream. A second reservoir 117' may be fluidly coupled to the second water delivery device 105' to store or accumulate liquid water discharged from the input fuel stream. The second reservoir 117' may be configured to add more water into the input fluid stream in the event additional amounts of water may be needed. The implementation of the second water delivery device 105' is optional and varies based on the desired criteria of a particular implementation. The second reservoir 117' may also prevent flooding in the anodes 130a-130n.

The ejector 114 generally controls the flow of the input fuel stream to the fuel cell stack 106. The second reservoir 117' is configured to accumulate water that may be discharged from the input fuel stream in the event a temperature drop exists between the second water delivery device 105' and the second reservoir 117'. In addition, the input fuel stream may absorb water from the second reservoir 117' in the event the input fuel stream is capable of absorbing additional amounts of water. As noted above, an increase in temperature between the second water delivery device 105' and the second reservoir 117' may allow the input fuel stream to collect more water. It is generally contemplated that the first and/or the second reservoirs 117 and 117' may be implemented within the system 100.

The fuel cell stack 106 includes a second inlet 109 that is adapted to receive the input fuel stream from the ejector 114 and the second reservoir 117'. The fuel cell stack 106 generates stack current in response to electrochemically converting the hydrogen from the input fuel stream and oxygen from the first fluid stream. A battery 121 is operably coupled to the fuel cell stack 106 to store and discharge power generated by the fuel cell stack 106.

Various electrical devices 120 are coupled to the battery to consume such power in order to operate. If the system 100 is used in connection with a vehicle, the devices 120 may include a motor or a plurality of vehicle electrical components that each consume power to function for a particular purpose. For example, such devices 120 may be associated with and not limited to a vehicle powertrain, occupant heating and cooling, interior/exterior lighting, entertainment devices, and power locking windows. The particular types of devices 120 implemented in the vehicle may vary based on vehicle content, the type of motor used, and the particular type of fuel cell stack implemented. A current sensor 122 measures the stack current generated by fuel cell stack 106. The current sensor 122 transmits measured current readings to a controller 124.

In general, excess amounts of air and hydrogen are delivered to the fuel cell stack 106 to increase operational robustness of the fuel cell stack 106. The fuel cell stack may discharge unused hydrogen in an unused fuel stream. An outlet 111 of the fuel cell stack 106 is adapted to discharge the unused fuel stream. The unused fuel stream may include various impurities such as nitrogen and water both in liquid and vapor form in addition to hydrogen.

A water knockout system 123 receives the unused fuel stream from the fuel cell stack 106. The water knockout system 123 is adapted to remove water in liquid form from the unused fuel stream. The water knockout system 123 is operatively coupled to the controller 124. The water knockout system 123 includes a drain valve (not shown) with a level switch indicator (not shown). The controller 124 operates the drain valve such that the drain valve opens to allow the water to flow out of the water knockout device 123 in response to the level switch indicator indicating that a predetermined amount of liquid water is present in the water knockout device 123.

A hydrogen concentration sensor 125 measures the amount of hydrogen in the unused fuel stream and transmits data indicative of the amount of hydrogen to the controller 124. In one example, the hydrogen concentration sensor 125 may be implemented to include the teachings of the gas analyzing apparatus as disclosed in co-pending U.S. Ser. No. 11/318, 143; U.S. Patent Publication No: 20070148510 filed on Dec. 23, 2005, entitled "Gas Analyzing Apparatus and Method", which is hereby incorporated in its entirety by reference. The controller 124 includes a predetermined hydrogen set point stored therein to determine whether the amount of unused fuel stream includes a higher concentration of hydrogen or nitrogen. In one example, if the unused fuel stream includes an amount of hydrogen that is greater than the predetermined hydrogen set point, then the controller 124 determines that more hydrogen is in the unused fuel stream than nitrogen. If the controller 124 determines that the unused hydrogen stream includes an amount of hydrogen that is less than the predetermined hydrogen set point, then the controller 124 determines that less hydrogen is in the unused fuel stream than nitrogen. In one example, the predetermined hydrogen set point may be set to 60%. It is generally acknowledged that the hydrogen concentration does not have to be less than the nitrogen concentration for purging to occur.

A purge valve 127 is fluidly coupled to the hydrogen concentration sensor 125 and electrically coupled to the controller 124. In the event more nitrogen is in the unused fuel stream than hydrogen based on the comparison of hydrogen to the predetermined hydrogen set point, the controller 124 controls the purge valve 127 to open to discharge both hydrogen and nitrogen from the unused fuel stream. In response to the purge valve 127 opening to discharge both hydrogen and nitrogen, the controller 124 controls the tank valve 110 to increase the flow of hydrogen into the system 100 to increase the amount of hydrogen present in the system 100. The controller 124 controls the purge valve 127 to close in response to detecting that the hydrogen in the unused fuel stream is above the predetermined hydrogen set point. In another implementation, the purging operation may also be time based controlled.

A bypass valve 126 is configured to receive the unused fuel stream from the purge valve 127 and is electrically coupled to the controller 124. The bypass valve 126 includes an inlet 128 for receiving the unused fuel stream and an outlet 130 for delivering the unused fuel stream to the ejector 114. A blower 134 is configured to receive the unused fuel stream and increase the flow and pressure rate for recirculating the unused fuel stream in response to the controller 124. The bypass valve 126 and the blower 134 are coupled in a parallel manner with respect to the purge valve 127.

The controller 124 activates the blower 134 to increase the flow of the unused fuel stream based on the amount of power that is generated by the fuel cell stack 106. While the fuel cell stack 106 is in a low current generating mode, the flow and pressure of the unused fuel stream and the input fuel stream may be low. In general, the fuel cell stack 106 may be in the low current generating mode when the vehicle or apparatus is in an idle state. In such a case, water buildup may occur within the first and/or the second flow plates within the one or more of the fuel cells 103a-103n in the fuel cell stack 106 and prevent hydrogen or oxygen from contacting the anodes 130a-130n and the cathodes 132a-132n, respectively. In addition, while in the low current generating mode, in the event there is more nitrogen in the unused fuel stream than hydrogen (generally such a condition may not exist while the fuel cell stack 106 is operating under normal operation, but may, nonetheless exist), such a condition may provide a gas mixture that is heavier when compared to the unused fuel stream that includes a sufficient amount of hydrogen. The heavier weight characteristic coupled with the low flow condition caused while the system 100 is in the low current generating mode may make it difficult to recirculate the proper amount of hydrogen back to the fuel cell stack 106. In the low current generating mode, the controller 124 controls the blower 134 to increase the flow rate and pressure of the input fuel stream and the unused fuel stream. While in the low current generating mode, the controller 124 closes the inlet 128 of the bypass valve 126 to force the unused fuel stream to pass to the blower 134. The increased flow rate created by the blower 134 drives water from the first and/or second flow plates within the one or more of the fuel cells 103a-103n and prevents localized fuel starvation and cell corrosion. By purging the nitrogen from the unused fuel stream, blower efficiency may be achieved as the blower 134 may use less power to increase the flow of the unused fuel stream since the overall weight of the unused fuel stream is reduced due to the purging of the nitrogen from the unused fuel stream.

In the event the fuel cell stack 106 is in a high current generating mode (e.g., vehicle operating at high speed and generating large amounts of current), the controller 124 may disable the blower 134 and activate the bypass valve 126 to allow the unused fuel stream to pass through the bypass valve 126 and to the variable ejector 114. In the high current generating mode, the flow rate and pressure of the input fuel stream and the unused fuel stream may be adequate to carry water away from the flow fields of the first and/or the second flow plates in the one or more fuel cells 103a-103n. The use of the blower 134 may not be needed while the system 100 is in the high current generating mode. In the high current generating mode, the unused fuel stream passes through the bypass valve 126 and not through the blower 134 to prevent the blower 134 from becoming a flow restrictor. A check valve 131 is coupled in series with the blower 134. The check valve 131 prevents a reverse flow of the unused fuel stream back to the blower 134 while the system 100 is in the high current generating mode.

The ejector 114 is adapted to increase or decrease the flow rate of the input fuel stream into the stack 106 and pressure of hydrogen (e.g., the unused hydrogen discharged from the fuel cell stack 106 and the supply hydrogen delivered from the tank 108) presented to the fuel cell stack 106 in response to the controller 124. The ejector 114 is adapted to receive the supply hydrogen at a constant pressure rate. The ejector 114 is adapted to receive the unused fuel stream at varying flow rates.

The ejector 114 may be implemented with a solenoid (not shown) and/or a needle valve (not shown). The solenoid may move the needle valve in the ejector 114 in response to the controller 124 thereby allowing for an increase or decrease of the flow and pressure of input fuel stream presented to the fuel cell stack 106. The movement of the needle is variable in nature to allow for different flow rates of the unused hydrogen to be combined with the supply fuel stream from the tank 108. Such a variable characteristic allows the ejector 114 to adjust the overall flow and pressure of the input fuel stream presented to the fuel cell stack 106. While the system 100 is in the high current generating mode, the ejector 114 increases the flow of the input fuel stream to a level above the flow provided by the blower 134 which may be adequate to remove water from the membranes of the fuel cells in the fuel cell stack 106.

The fuel cell stack 106 includes an outlet 115 that is configured to discharge excess air. The fuel cell stack 106 includes outlet 116 that is adapted to present coolant in the form of de-ionized water ethylene glycol (DIWEG) or other suitable coolant in response to the heat generated due to the electrochemical processing of hydrogen and oxygen (e.g., from the air stream). A cooling interface 138 may receive the DIWEG from the fuel cell stack 106. The cooling interface 138 may also provide stack coolant to an inlet 113 of the fuel cell stack 106.

Figure 2:
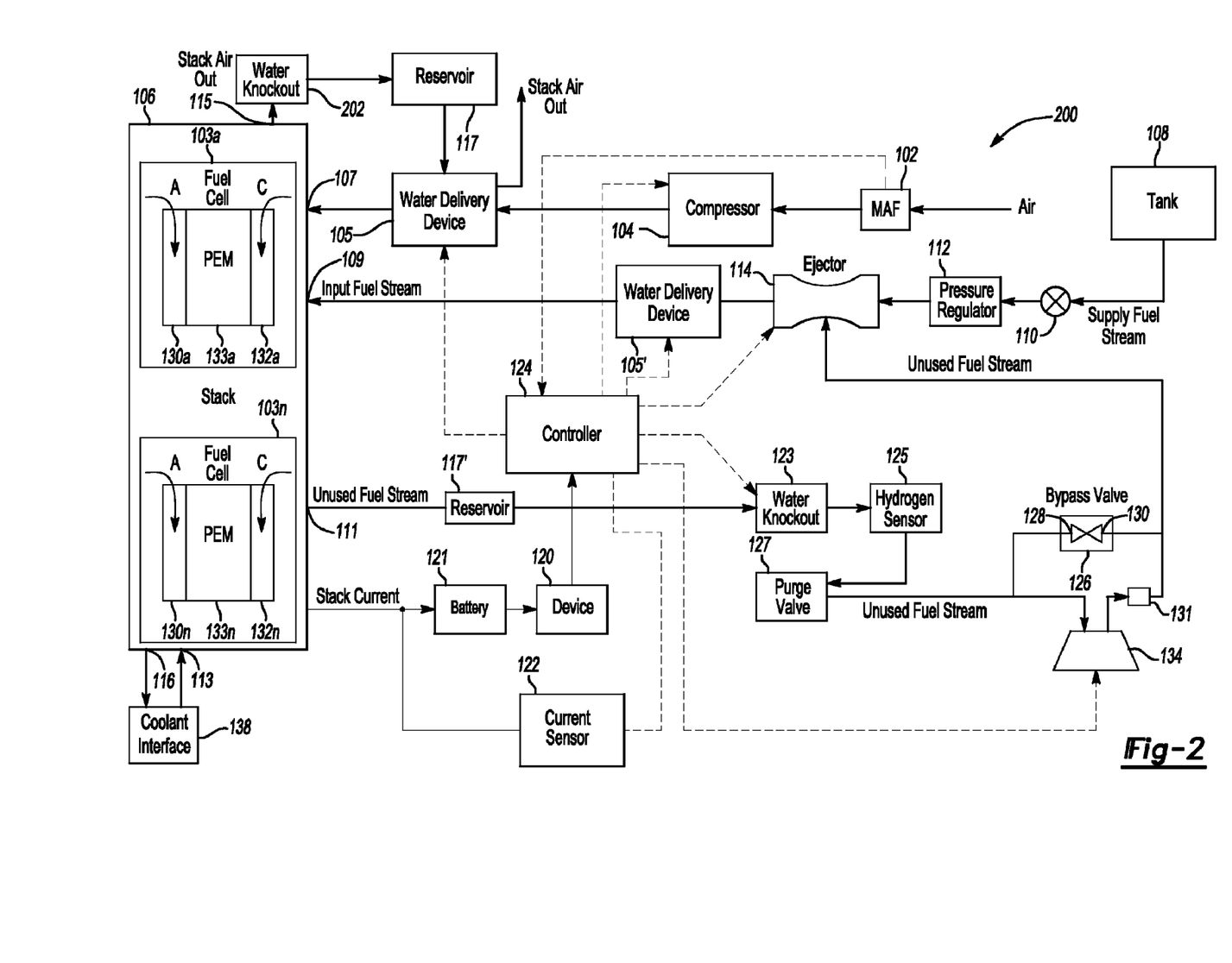
FIG. 2 depicts a fuel cell stack hydrating system in accordance to another embodiment of the present invention.

FIG. 2 depicts a fuel cell stack hydrating system 200 in accordance to another embodiment of the present invention. The system 200 is implemented such that the first reservoir 117 is fluidly coupled to the outlet 115 of the fuel cell stack 106 for receiving the excess air discharged from the fuel cell stack 106. The first reservoir 117 generally includes corrugated regions that are coupled with each other. The first reservoir 117 presents the excess air to the first water delivery device 105 to further add water content to the first fluid stream in the event additional water content is needed to ensure that the membranes 133a-133n remain hydrated.

In the high current generating mode, a portion of the water generated in response to electrochemically combining hydrogen from the input fuel stream and oxygen from the first fluid stream is discharged with the excess air from the outlet 115 of the fuel cell stack 106. Corrugated regions of the first reservoir 117 are configured to accumulate water due to the increased flow of the excess air being discharged from the fuel cell stack 106 and the increased amount of water available in the excess air as a result of combining hydrogen and oxygen while the system 200 is in the high current generating mode.

In the low current mode, there may not be enough water generated in response to electrochemically combining oxygen and hydrogen to hydrate the membranes 133a-133n using the water delivery device 105. The flow rate of the first fluid stream and the input fuel stream in the low current generating mode is generally reduced as the vehicle is generally in an idle state. To hydrate the membranes 133a-133n in the low current generating mode, the excess air is passed out of the outlet 115 and to the first reservoir 117. Water accumulated within the first reservoir 117 is picked up by the excess air. The first reservoir 117 passes the excess air that includes water from the corrugated regions to the first water delivery device 105 to add additional water content to the first fluid stream for hydrating the membranes 133a-133n while the system 200 is in the low-current generating mode. Such an operation may add more water content into the first fluid stream prior to the first fluid stream entering into the fuel cells 103a-103n. In general, the reservoir 117 is adapted to collect liquid water that drops out of the gas (e.g., air and/or hydrogen) due to saturation. Also, the reservoir 117 facilitates the process of allowing water to evaporate into the gas (e.g., air and/or hydrogen) if the gas is not saturated.

A water knock out system 202 is positioned between the outlet 115 of the fuel cell stack 106 and the first reservoir 117. The water knockout system 202 is generally adapted to remove water in liquid form from the excess air. The water knockout system 202 is operatively coupled to the controller 124. The water knockout system 202 includes a drain valve (not shown) with a level switch indicator (not shown). The controller 124 operates the drain valve such that the drain valve opens to allow the water to flow therethrough out of the excess air in response to the level switch indicator indicating that a predetermined amount of liquid water is present in the excess air (e.g., when excess air is saturated with water). It is generally contemplated that the first reservoir 117 may be in direct fluid communication with the outlet 115 of the fuel cell stack 106. In such a configuration, the water knockout system 123 may be positioned between the water delivery device 105 and the first reservoir 117.

The system 200 further includes the second reservoir 117' positioned between the fuel cell stack 106 and the water knockout system 123. The operation of the second reservoir 117' is generally similar to the first reservoir 117 as noted in connection with the excess air with the exception that the unused fuel stream (or unused hydrogen) passes through the second reservoir 117'.

While FIG. 2 illustrates the first reservoir 117 in fluid communication with the outlet 115 of the fuel cell stack 106, additional reservoirs may be added such that each added reservoir is in fluid communication with the inlet 107 and/or the inlet 109 of the fuel cell stack 106.

Figure 3A:
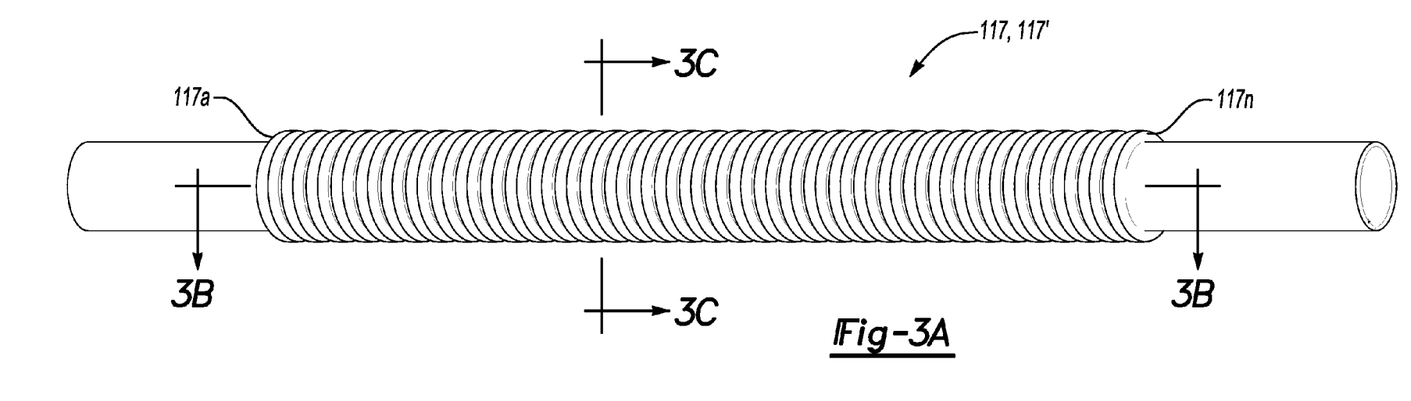
FIG. 3A depicts a side view of the reservoir of the system in accordance to one embodiment of the present invention.
Figure 3B:
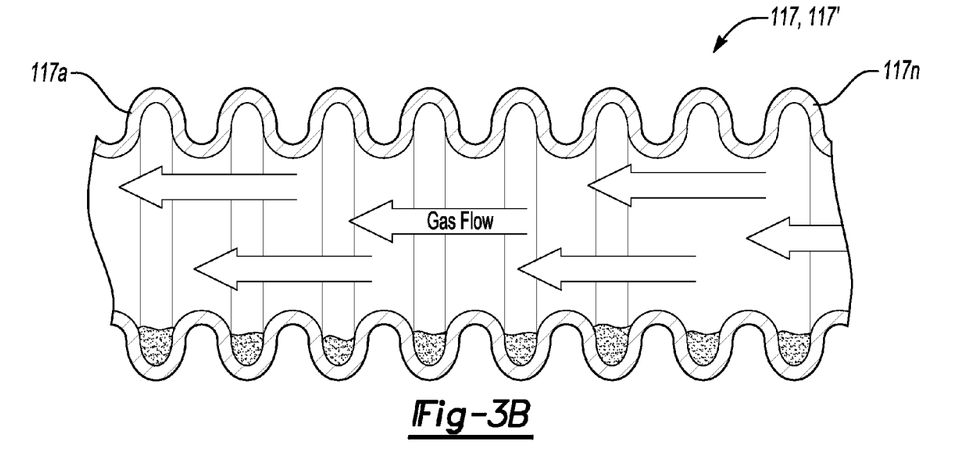
FIG. 3B depicts a cross sectional side view of the reservoir in accordance to one embodiment of the present invention.
Figure 3C:
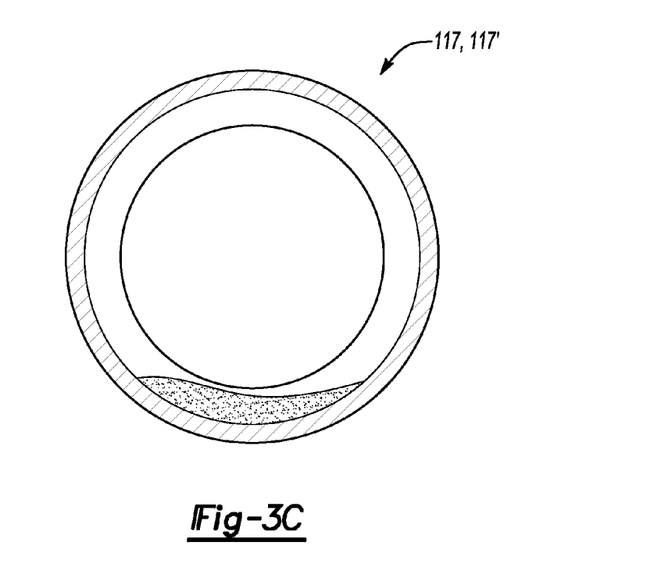
FIG. 3C depicts a cross-sectional view of the reservoir in accordance to one embodiment of the present invention.

FIGS. 3A-3C depicts a plurality of views of the reservoir 117, 117' in accordance to one embodiment of the present invention. The reservoir 117, 117' includes a plurality of corrugated regions 117a-117n for accumulating water in liquid or vapor form from either the first fluid stream or the excess air (or from the input fuel stream or the unused fuel stream). As shown in FIG. 3C, the water may tend to reside in lower portions of the corrugated regions 117a-117n. Air may inherently store the maximum amount of water (or moisture) for a given temperature. As air or hydrogen (or gas) passes through the reservoir 117, 117', such gas may absorb water in the event the gas has not reached a saturated state (or particular water level). In the event gas includes too much water content, the water is discharged from the gas and into the corrugated regions 117a-117n as gas passes therethrough.

The reservoir 117, 117' is generally situated such that the streams (e.g., air or hydrogen) that flow therethrough are not impeded by water that resides within the corrugated regions 117a-117n. For example, in the event a conventional tube or reservoir is implemented, the presence of water may reduce the overall diameter of the reservoir thereby impeding the flow of the streams through the tube. Such a condition may make it difficult for the fuel cell stack 106 to receive the air and/or hydrogen during cold start conditions, particularly if water freezes within the conventional tube or reservoir. Since the water accumulates in the corrugated regions 117a-117n of the reservoir 117, 117', the flow diameter of the reservoir 117, 117' is maintained even if the water within the corrugated regions 117a-117n freeze during cold start conditions. It is generally contemplated that the reservoirs 117, 117' may be stainless steel, plastic, polymer or other suitable material. The geometry of the corrugated regions may be square, triangular or other such suitable shape so long as such a shape enables liquid storage within the reservoir.

Figure 4:
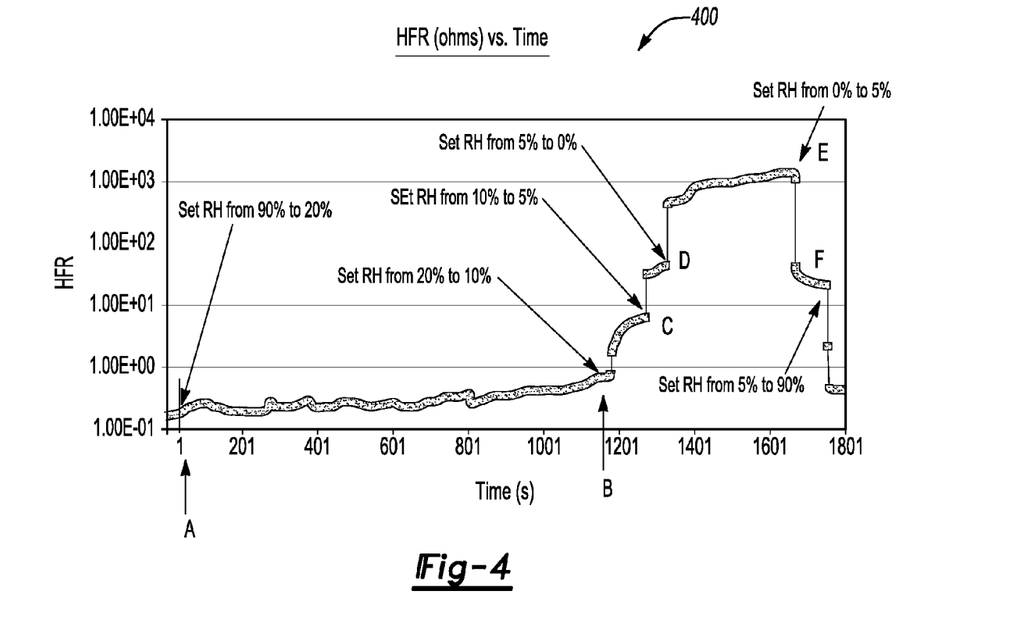
FIG. 4 depicts a plot illustrating high frequency resistance which reflects the hydration state of the membrane.

FIG. 4 depicts a plot 400 illustrating high frequency resistance which reflects the hydration state of the membrane. The x-axis represents time in seconds and the y-axis represents high frequency resistance which reflects the hydration state of the membranes. In general, the lower the resistance of the membrane, the higher the water content is in the membrane. At point A, the relative humidity was set from 90% to 20% at a time of 35 seconds where the resistance was monitored thereafter. Plot 400 illustrates that the corrugated regions 117a-117n supplied water to maintain low resistance of the membrane for about 1200 seconds. After the water is removed from the corrugated regions, the resistance of the membranes responds to the reduced humidity levels within the incoming gas and increases as shown in points B, C, and D. When the relative humidity of the incoming gas increases, the resistance of the membranes drops rapidly as shown at points E and F. In general, by controlling the volume of the corrugated regions within the reservoir, it is possible to modulate/control the amount of time available to hydrate the membranes.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell hydration apparatus comprising:
a first reservoir positioned between a cathode supply and a fuel cell stack, the first reservoir including a first plurality of corrugated regions positioned axially along the first reservoir to accumulate water discharged from a first fluid stream, wherein the first fluid stream absorbs the accumulated water when an amount of water within the first fluid stream is below a water level to hydrate the stack and wherein the first plurality of corrugated regions are impermeable for preventing the accumulated water from passing therethrough.

2. The apparatus of claim 1 wherein the first reservoir is configured to prevent water in liquid form from entering into a first inlet of the fuel cell stack.

3. The apparatus of claim 1 further comprising a second reservoir positioned between a cathode supply and the fuel cell stack, the second reservoir including a second plurality of corrugated regions positioned axially along the second reservoir to accumulate water discharged from a second fluid stream, wherein the second fluid stream absorbs the accumulated water when an amount of water within the first fluid stream is below a water level to hydrate the fuel cell stack, and wherein the second plurality of corrugated regions are impermeable for preventing the accumulated water from passing through therethrough.

4. The apparatus of claim 3 wherein each of the first plurality of corrugated regions and the second plurality of corrugated regions are formed of one of stainless steel, plastic and a polymer.

5. An apparatus for hydrating one or more membranes positioned within a fuel cell stack of a vehicle, the apparatus comprising:
a first reservoir including a first plurality of corrugated regions positioned axially along the first reservoir and fluidly coupled between a cathode supply that generates a first fluid stream having varying levels of water and a first inlet of the fuel cell stack, the first reservoir being configured to:
accumulate excess water discharged from the first fluid stream on the first plurality of corrugated regions in the event a first amount of water within the first fluid stream exceeds a first particular water level, and
facilitate the absorption of water into the first fluid stream from the accumulated water on the first plurality of corrugated regions in the event the first amount of water within the first fluid stream is below the particular water level for hydrating the one or more membranes of the fuel cell stack,
wherein the first plurality of corrugated regions are impermeable for preventing the accumulated water from passing therethrough.

6. The apparatus of claim 5 further comprising an anode supply for generating an input fuel stream including varying levels of water for delivery to a second inlet of the fuel cell stack and for electrochemical conversion with the first fluid stream to generate electrical current and to discharge water in an unused fuel stream.

7. The apparatus of claim 6 further comprising a second reservoir including a second plurality of corrugated regions positioned axially along the second reservoir and being fluidly coupled between the anode supply and the second inlet of the fuel cell stack.

8. The apparatus of claim 7 wherein the second reservoir is configured to accumulate excess water discharged from the input fuel stream on the second plurality of corrugated regions in the event a second amount of water within the input fuel stream exceeds a second particular water level, wherein the second plurality of corrugated regions are impermeable for preventing the accumulated water from passing therethrough.

9. The apparatus of claim 8 wherein the second reservoir is configured to facilitate the absorption of water into the input fuel stream from the accumulated water on the second plurality of corrugated regions in the event the second amount of water within the input fuel stream is below the second particular water level for hydrating the one or more membranes of the fuel cell stack and to prevent water from entering into the second inlet of the fuel cell stack.

10. The apparatus of claim 6 further comprising a second reservoir including a second plurality of corrugated regions positioned along the second reservoir and being coupled to an outlet of the fuel cell stack for delivering the unused fuel stream to the fuel cell stack.

11. The apparatus of claim 10 wherein the second reservoir is configured to accumulate excess water from the unused fuel stream on the second plurality of corrugated regions in the event a second amount of water within the unused fuel stream exceeds a second particular water level and to facilitate the absorption of water into the unused fuel stream from the accumulated water on the second plurality of corrugated regions in the event the second amount of water within the unused fuel stream is below the second particular water level for hydrating the one or more membranes of the fuel cell stack, wherein the second plurality of corrugated regions are impermeable for preventing the accumulated water from passing therethrough.

12. An apparatus for hydrating one or more membranes positioned within a fuel cell stack of a vehicle, the apparatus comprising:
a first reservoir including a first plurality of corrugated regions positioned axially thereof and being fluidly coupled between an anode supply that generates an input fuel stream having varying levels of water and a first inlet of the fuel cell stack, the first reservoir being configured to:
accumulate excess water discharged from the input fuel stream on the first plurality of corrugated regions in the event a first amount of water within the input fuel stream exceeds a first particular water level, and
facilitate the absorption of water into the input fuel stream from the accumulated water on the first plurality of corrugated regions in the event the first amount of water within the first fluid stream is below the particular water level for hydrating the one or more membranes of the fuel cell stack, wherein the first plurality of corrugated regions are impermeable for preventing the accumulated water from passing therethrough.

13. The apparatus of claim 12 further comprising an cathode supply for generating a first fluid stream including varying levels of water for delivery to a second inlet of the fuel cell stack for electrochemical conversion with the input fuel stream to generate electrical current and to discharge an excess air stream.

14. The apparatus of claim 13 further comprising a second reservoir including a second plurality of corrugated regions positioned thereof and being fluidly coupled between the cathode supply and the second inlet of the fuel cell stack.

15. The apparatus of claim 14 wherein the second reservoir is configured to accumulate excess water discharged from the first fluid stream on the second plurality of corrugated regions in the event a second amount of water within the first fluid stream exceeds a second particular water level.

16. The apparatus of claim 15 wherein the second reservoir is configured to facilitate the absorption of water into the first fluid stream from the accumulated water on the second plurality of corrugated regions in the event the second amount of water within the first fluid stream is below the second particular water level for hydrating the one or more membranes of the fuel cell stack and to prevent water from entering into the second inlet of the fuel cell stack, wherein the second plurality of corrugated regions are impermeable for preventing the accumulated water from passing therethrough.

17. The apparatus of claim 13 further comprising a second reservoir including a second plurality of corrugated regions positioned thereof and being coupled to an outlet of the fuel cell stack for delivering the excess air stream to the first fluid stream.

18. The apparatus of claim 17 wherein the second reservoir is configured to accumulate excess water from the excess air stream on the second plurality of corrugated regions in the event a second amount of water within the excess air stream exceeds a second particular water level and to facilitate the absorption of water into the excess air stream from the accumulated water on the second plurality of corrugated regions in the event the second amount of water within the excess air stream is below the second particular water level for hydrating the one or more membranes of the fuel cell stack, wherein the second plurality of corrugated regions are impermeable for preventing the accumulated water from passing through an exterior portion thereof.

19. The apparatus of claim 5 wherein the first plurality of corrugated regions are formed of one of stainless steel, plastic and a polymer.

20. The apparatus of claim 12 wherein the first plurality of corrugated regions are formed of one of stainless steel, plastic and a polymer.

21. A fuel cell hydration apparatus comprising:
a reservoir positioned between a fuel cell stack and one of a cathode supply and an anode supply for receiving a fluid stream therefrom, the reservoir including a plurality of corrugated regions positioned axially along the first reservoir for accumulating excess water that is discharged from the first fluid stream, wherein the first plurality of corrugated regions are impermeable for preventing the accumulated excess water from passing therethrough.

* * * * *